CLEANING APPARATUS AND METHOD

Filed March 15, 1967 2 Sheets-Sheet 1

Sept. 29, 1970 R. D. CARPENTER ET AL 3,531,323

CLEANING APPARATUS AND METHOD

Filed March 15, 1967 2 Sheets-Sheet 2

United States Patent Office 3,531,323
Patented Sept. 29, 1970

3,531,323
CLEANING APPARATUS AND METHOD

Richard D. Carpenter, Satellite Beach, Jerry L. Schad, Melbourne, Jess M. Delozier, Titusville, John H. Brown, Eau Gallie, and William G. Roy, Satellite Beach, Fla., assignors to Aerospace Tools, Inc., Satellite Beach, Fla., a corporation of Florida Filed Mar. 15, 1967, Ser. No. 623,354
Int. Cl. B08b 7/02, 9/02
U.S. Cl. 134—1 23 Claims

ABSTRACT OF THE DISCLOSURE

An apparatus and method for cleaning closed-end instruments and components such as Bourdon gages, which includes alternately pressure-surging a quantity of a cleaning solvent into the component which has been evacuated, and vacuum-withdrawing the cleaning solvent and contaminants dispersed therein. A filter is provided for sampling the cleaning solvent as it is being withdrawn for the purpose of determining the degree of cleanliness of the component. The cleaned component is dried by alternately pressure-surging a heated gas under pressure into the component and vacuum-withdrawing the gas from the component.

BACKGROUND OF THE INVENTION

This invention relates to article cleaning and more particularly to a method and apparatus for cleaning closed-end components to low contamination levels.

In the aerospace industry as well as in other industries, it is important that the highest possible degree of reliability and accuracy be achieved in the performance and operation of a system. One way of insuring this is to assure that certain established cleanliness levels are met by the various components which make up a system. It has been found that various precision instruments and sensitive components which are certified clean, actually contain significant amounts of contaminants and may cause the system to fail or malfunction.

Some of the most difficult of these to clean to the required low contamination levels are often referred to as closed-end components, such as pressure gages which employ Bourdon tubes, switches, transducers, and the like. Heretofore, such components have been cleaned by manually squirting a cleaning solvent into the inlet orifice of the component and then either manually shaking the solvent out of the component or placing the component under a bell jar and applying a vacuum to remove the solvent and contaminants. This manual procedure would be repeated many times until the desired low contamination level was finally reached.

Cleaning such closed-end components by this technique is very time consuming, sometimes taking up to sixteen man hours per component. Even after this period of time, the degree of cleanliness of the component is often suspect, and uniformity of the cleanliness level between components cleaned by this procedure is difficult to maintain. Also, by this manual technique, components are sometimes damaged during the operation and in some instances the calibration or accuracy of the particular component is disturbed.

To fulfill the urgent needs of industry to achieve cleaner systems, a principal object of the present invention is to provide an apparatus and method for cleaning closed-end components which substantially overcomes or minimizes the problems heretofore encountered.

Another object of this invention is to provide an apparatus which employs a unique turbulent cleaning action for cleaning closed-end components, such as Bourdon gages, to uniformly low levels of contamination, automatically, and in a short period of time.

SUMMARY

In accordance with a preferred embodiment, the above and other objects are attained by the provision of an apparatus having a closed system wherein a closed-end component to be substantially completely cleaned is mounted on the apparatus and is subjected to a plurality of cleaning cycles, one or more sampling cycles, and a plurality of drying cycles, automatically and in a matter of minutes. A cleaning cycle comprises alternately pressure-surging a quantity of a cleaning solvent into the component which has been initially placed under vacuum and then rapidly vacuum-withdrawing the solvent to produce a vigorous cleaning action.

The component being cleaned may be mounted at a slight angle upwardly from the horizontal during the vigorous cleaning operation so as to bring about a highly efficient turbulent action of the solvent within the component, known as song motion, which greatly enhances its cleaning action.

After a preset number of cleaning cycles have been completed, the cleaning solvent being withdrawn from the component may be passed through a filtering medium so as to determine whether the component has been cleaned to the desired low contamination level.

When the desired level has been reached, the cleaned component may be dried by alternately, pressure-surging a heated dry gas into the component and vacuum-withdrawing the gas therefrom a preset number of cycles.

DESCRIPTION OF THE PREFERRED EMBODIMENT

Figure 1:
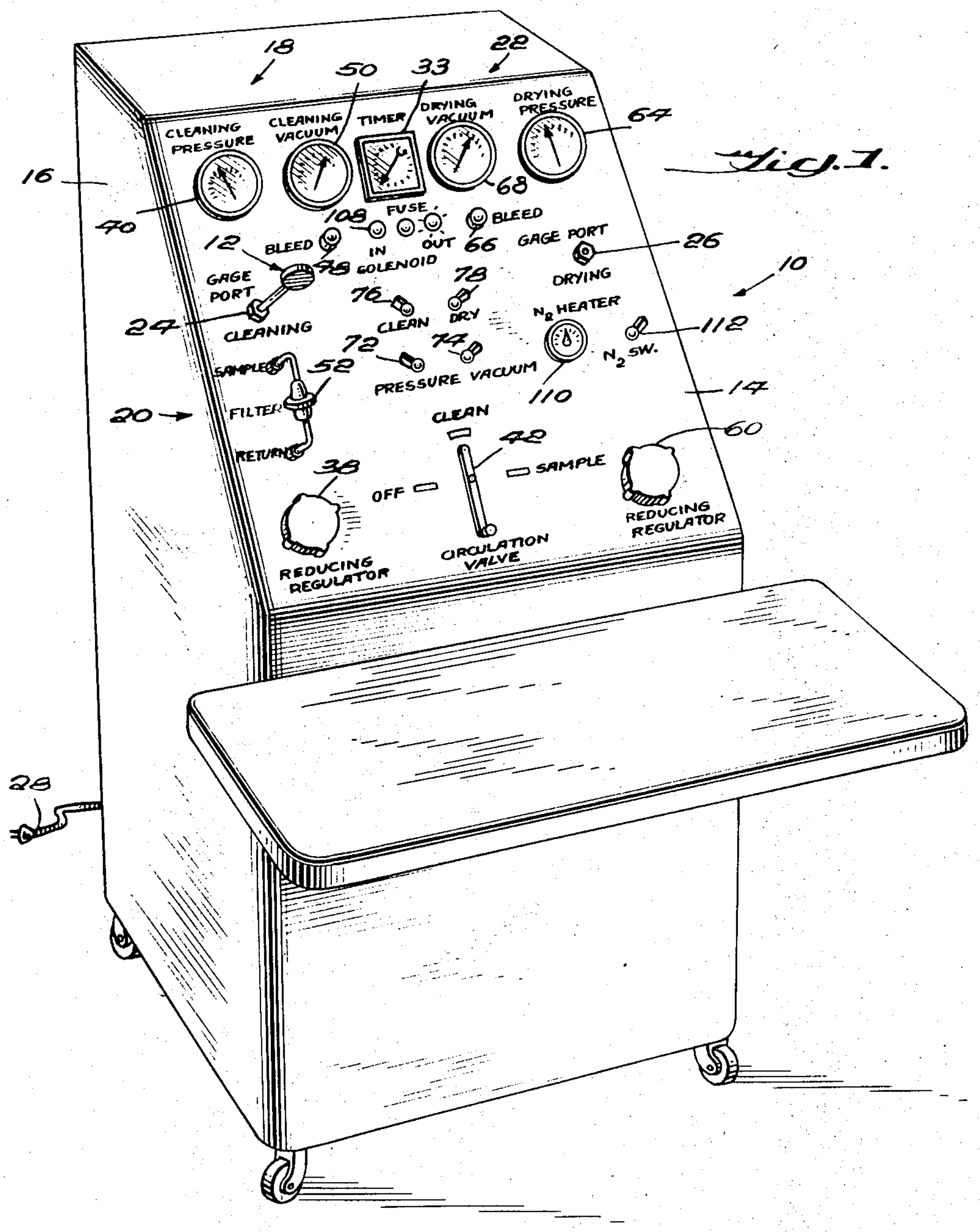
FIG. 1 is a perspective view of a preferred embodiment of a cleaning apparatus constructed in accordance with the present invention.

With reference to the drawings, there is shown in FIG. 1, a cleaning apparatus generally indicated by the numeral 10, for cleaning a closed-end component such as a Bourdon gage 12. The gage 12 may be conveniently mounted on a control panel 14 of a suitable cabinet structure 16 which houses the various fluid and electrical lines, instruments, controls, switches, etc. which make up a cleaning circuit 18, a sampling circuit 20, and a drying circuit 22.

Cleaning the gage 12 and sampling the solvent used for the cleaning may be carried out with the gage secured to a gage cleaning port 24. A separate gage drying port 26 may be provided for the drying operation. Electrical power for the required electrical needs of the apparatus 10 may be supplied by a power cable 28 which may be conveniently plugged into a standard 110 volt, 60 cycle A.C. outlet (not shown).

Figure 2:
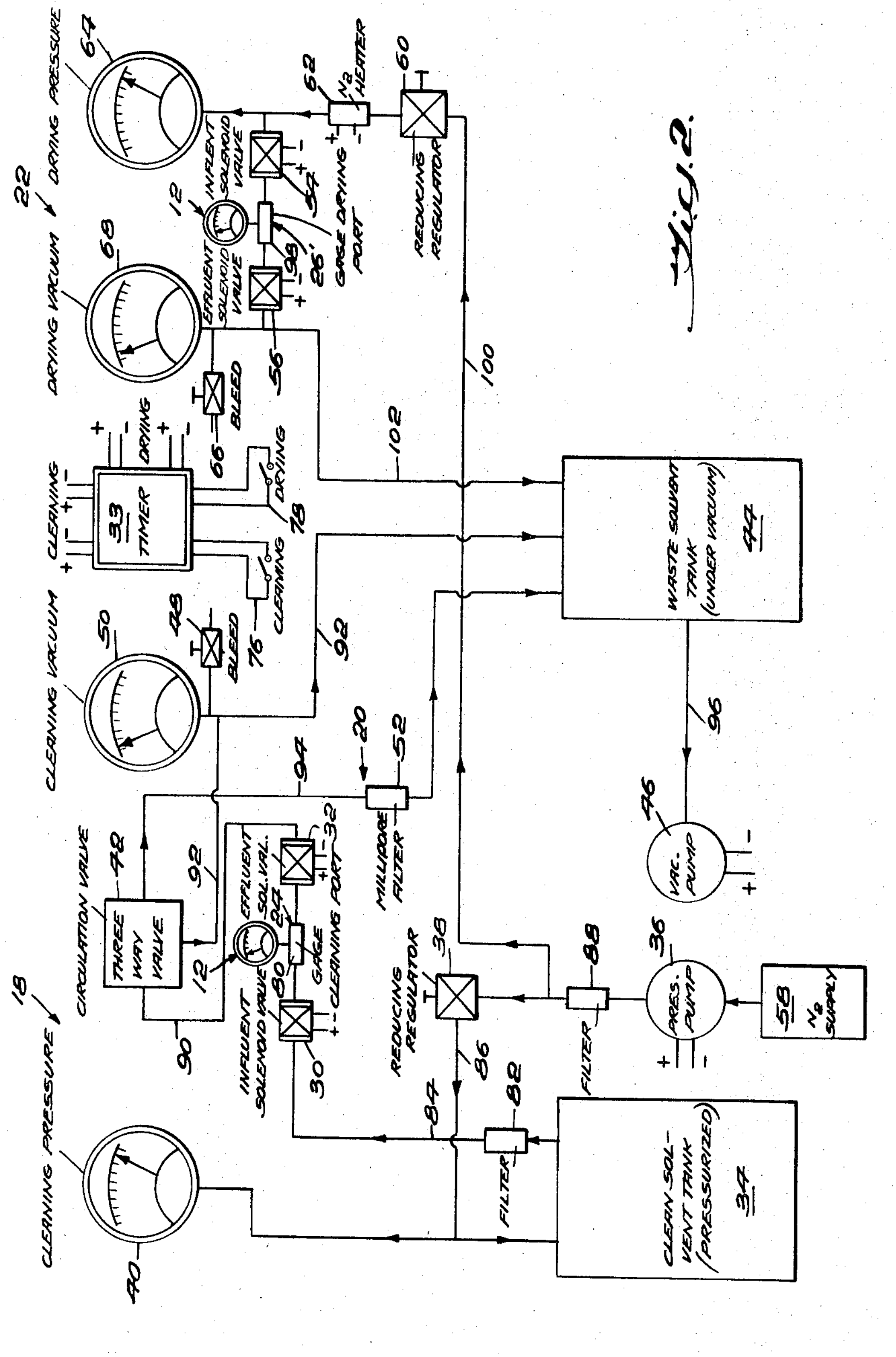
FIG. 2 is a schematic view of the cleaning, sampling, and drying circuits of the cleaning apparatus of FIG. 1.

Referring now to FIG. 2, the cleaning circuit 18 has a pressure side and a vacuum side which provide means to pressure-surge a quantity of solvent into the gage 12 and means to vacuum-withdraw the solvent from the gage, respectively. The pressure and vacuum sides of the cleaning circuit 18 are alternately placed in fluid communication with the Bourdon gage 12 by a sequential operation of an influent solenoid valve 30 and an effluent solenoid valve 32. These valves are automatically controlled by an electrically operated timer 33 in a manner to be described in more detail below.

The pressure side of the cleaning circuit 18 includes a clean solvent or cleaning fluid tank 34, a pressure pump 36 for pressurizing the solvent in the tank, and a reducing regulator 38 for controlling the pressure in the tank. A cleaning pressure gage 40 may be connected to the tank 34 to indicate the pressure level therein.

The vacuum side of the cleaning circuit 18 includes a three-way circulation valve 42, a waste solvent receiving tank 44, a vacuum pump 46 for placing the waste tank under vacuum, and a bleed valve 48 for adjusting the level of vacuum in the waste tank 44 as indicated by a cleaning vacuum gage 50.

The circulation valve 42 provides a means to change the path of effluent solvent being vacuum-withdrawn from the Bourdon gage 12 to flow through a Millipore filter 52 or other suitable filtering device upstream of the waste tank 44. The circulation valve 42 thus serves to bring the sampling circuit 20 into operation. Except for the Millipore filter 52, the sampling circuit 20 has in effect a pressure side and a vacuum side which comprise all of the elements that make up the cleaning circuit 18.

The drying circuit 22 comprises a pressure side and a vacuum side for alternately pressure surging a quantity of a suitable gas into the cleaned Bourdon gage 12, shown in dotted lines, and vacuum-withdrawing the gas therefrom, respectively. An influent solenoid valve 54 and an effluent solenoid valve 56, actuated and controlled by the timer 33, provide the means for placing the gage 12 in fluid communication with the components which form the pressure and vacuum sides of the drying circuit 22.

On the pressure side, these components include the pressure pump 36 for pressurizing the gas supplied from a source 58, a reducing regulator 60, a gas heater 62 and a drying pressure gage 64.

The vacuum side components of the drying circuit 22 comprise the waste solvent tank 44 placed under vacuum by the vacuum pump 46, a bleed valve 66 and a drying vacuum gage 68.

Figure 3:
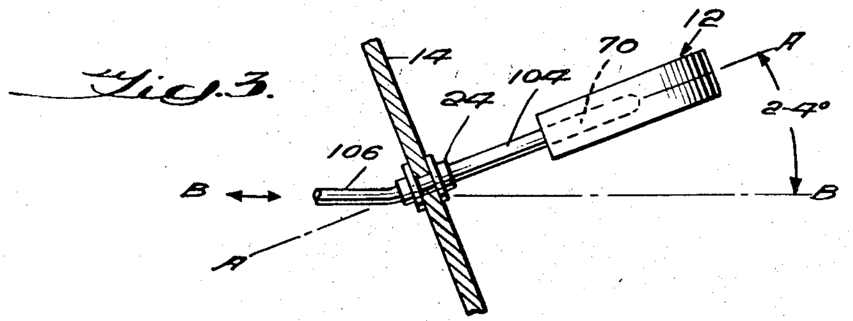
FIG. 3 is an elevational view of a closed-end component in the form of a Bourdon gage mounted on the control panel of the cleaning apparatus shown in FIG. 1.

To clean the gage 12, or more precisely to remove substantially all liquid and solid contaminants adhering to the internal surfaces of the Bourdon tube 70 thereof, the gage 12 may be secured to the cleaning port 24 in a slightly upwardly inclined position shown somewhat exaggerated in FIG. 3, for reasons to be described below. The pressure pump 36 and the vacuum pump 46 may then be activated by manipulation of a pressure pump switch 72 and a vacuum pump switch 74 located on the panel 14 to place their corresponding tanks 34 and 44 under the desired levels of pressure and vacuum, respectively. The cleaning operation may then be commenced by manipulation of a cleaning solenoid switch 76 which activates the influent and effluent solenoid valves 30 and 32 and the timer 33. The valves are then automatically controlled by the timer 33 to open and close alternately, and in rapid succession for a preset number of cycles, whereby a clean solvent is pressure-surged from the tank 34 into the Bourdon tube 70 and solvent containing dislodged contaminants is vacuum-withdrawn therefrom to the waste tank 44. This repetitive push-pull technique produces vigorous and turbulent movement of the solvent within the Bourdon tube 70 which results in a highly efficient cleaning action.

To sample the effluent solvent to ascertain if the gage 12 has been sufficiently cleaned, the circulation valve 42 may be turned to the "sample" position and the solenoid valves 30 and 32 and the timer 33 again activated. Solvent is pressure-surged in and vacuum-withdrawn from the gage 12 as before, but the effluent solvent is passed through the filter 52 before it is received by the waste tank 44.

After analysis of the foreign matter collected by the filter 52 indicates that the gage 12 has been cleaned to the required low level of contamination, the gage 12 may be secured to the drying port 26 to be dried. Actuation of a drying solenoid switch 78 activates the drying influent and effluent solenoid valves 54 and 56, respectively, and the timer 33, whereby drying gas from the source 58 may be similarly, alternately, pressure-surged in and vacuum-withdrawn from the Bourdon tube 70 in rapid succession a preset number of cycles until substantially all vapors and traces of liquid solvent have been removed.

In more detail, the cleaning and sampling circuits 19 and 20 may include a T fitting 80 connected to the gage cleaning port 24 with the influent solenoid valve 30 and the effluent solenoid valve 32 connected to each arm of the fitting by short sections of tubing or other fluid line equipment. The influent and effluent valves are preferably electrically operated and controlled through appropriate circuitry (not shown) associated with the timer 33 and are activated when the cleaning solenoid switch 76 is set to the on position.

When opened by an electrical signal from the timer 33, the influent solenoid valve 30 provides communication between the interior of the Bourdon tube 70 within gage 12 via the T fitting 80 and the clean solvent tank 34. Freon is preferred as the cleaning fluid, although any one of a number of appropriate organic solvents may be employed. A sintered-bronze filter 82 or the like may be provided in a fluid line 84 leading from the clean solvent tank 34 to the influent solenoid valve 30.

The tank 34 may be pressurized by the pressure pump 36 via a fluid line 86, which may inulude the reducing regulator 38, and a suitable gas filter 88. The cleaning pressure gage 40 may be conveniently connected into the line 86 for indicating the pressure within the tank 34 and the corresponding pressure on the Freon as determined by the setting of the reducing regulator 38. Thus, the left-hand side of the cleaning port T fitting 80 as viewed in FIG. 2, comprises the pressure side of the cleaning circuit 18.

The effluent solenoid valve 32 may be connected by a fluid line 90 to the three-way circulation valve 42 and when opened by a signal from the timer 33, fluid communication will be provided between the Bourdon tube 70 and the evacuated waste tank 44 either directly by way of a fluid line 92 or via the sampling filter 52 and a line 94 as determined by the setting of the circulation valve 42. The waste solvent tank 44 may be placed under vacuum by means of the vacuum pump 46 connected thereto by a suitable fluid line 96. The line 92 leading from the circulation valve 42 directly to the waste tank 44 may include a provision for the cleaning vacuum gage 50 and the bleed valve 48.

As for the drying circuit 22, it may include a similar T fitting 98 connected to the gage drying port 26 with the drying influent and effluent solenoid valves 54 and 56, respectively, connected to the arms thereof by suitable fluid line connections. The influent solenoid valve 54 may provide fluid communication between the Bourdon gage 12, the pressure pump 36 and the source 58 of the drying gas by way of a fluid line 100 which may include the gas heater 62 and the reducing regulator 60. Nitrogen has been found to be the most satisfactory gas for drying, although others may be used. The drying pressure gage 64 may be conveniently installed in line 100 to monitor the pressure of the nitrogen to the Bourdon gage 12.

The effluent solenoid valve 56 provides fluid communication between the gage drying port 26 and the evacuated waste solvent tank 44 by means of a fluid line 102 to which the drying vacuum gage 68 and its associated bleed valve 66 may be connected. As in the case with the cleaning influent and effluent valves 30 and 32, the drying solenoid valves 54 and 56 are operatively connected to the timer 33 and are automatically opened and closed in rapid succession in response to signals therefrom when the drying solenoid switch 78 is actuated.

A particularly novel feature of the present invention resides in the way in which the closed-end component is mounted with respect to the gage cleaning port 24 and the fluid line connections associated therewith. As shown in FIG. 3, the Bourdon gage 12 is secured to the cleaning port 24 such that the longitudinal axis A—A of the open end portion of the Bourdon tube 70, shown in dotted lines, and a stem portion 104 are inclined relative to the axis B—B of section of fluid line 106 by a small acute angle. This angle is preferably about 2 to 4 degrees upwardly from the horizontal. For some applications, the angle of inclination may be as much as about 15 degrees from the horizontal. By this mounting arrangement, the Freon which is injected into the Bourdon gage 12 via the stem portion 104 will change direction slightly from the T fitting 80 (not shown) and a short section of tubing 106. It has been found that this arrangement contributes to the creation of a highly turbulent effect termed song motion which provides a unique turbulent cleaning action of the present invention. In addition, the upward inclination allows for efficient ejection of the contaminants which are dislodged from the internal surfaces of the Bourdon tube 70 by the solvent.

The following is an example of how a closed-end sensitive component, such as the Bourdon gage 12, may be cleaned and dried by the method and apparatus of the invention.

CLEANING

With the Bourdon gage 12 secured to the gage cleaning port 24 in a slightly upwardly inclined manner, the power on and the clean solvent tank 34 filled with filtered Freon, the vacuum pump 46 is turned on and the vacuum in the waste tank 44 allowed to build up to approximately 16 inches Hg. The pressure pump 36 is turned on and the pressure in the clean tank 34 adjusted to approximately 25 p.s.i. by the reducing regulator 38. The circulation valve 42 is then placed in the "clean" position so as to connect fluid line 90 from the effluent solenoid valve 32 to the vacuum line 92 leading directly to the waste solvent tank 44. The timer 33 is set for the desired cleaning time, i.e., the number of predetermined cleaning cycles expected to clean the gage 12 to the desired cleanliness level and the cleaning solenoid switch 76 is turned on. The timer 33 signals the effluent valve 32 to open, thereby evacuating the Bourdon gage 12 to about 16 inches Hg and then to close sharply to hold the vacuum. Following the closing of the effluent valve 32, the timer pulses the influent solenoid valve 30 to open and then to close sharply to allow a quantity of Freon to be pressure-surged and vacuum-pulled into the evacuated gage 12. The Freon enters the Bourdon gage 12 with substantial turbulence and before the fluid becomes quiescent, the timer pulses the effluent valve 32 to open and allow the Freon and dislodged contaminants dispersed therein by the turbulent cleaning action, to be vacuum-withdrawn to the waste tank 44. This completes one cleaning cycle and normally takes about ten seconds or less.

The effluent solenoid valve 32 is preferably controlled by the circuitry of the timer 33 to close sharply after approximately 60 percent of the volume of clean solvent which was injected into the Bourdon gage 12, has been vacuum-withdrawn. This partial volume change of solvent during each cleaning cycle has been found to cause a small volume of air, remaining within the inner end of the Bourdon tube 70 to contract and expand during each cleaning cycle to produce a catalytic action which assists in removing and discharging the contaminants from the passage. The expansion and contraction of this trapped air upon the fluid also seems to promote the creation of song motion.

The physical phenomenon referred to as song motion has been found to be produced by a combination of the following factors: the slight inclination of the gage; the turbulence of the Freon resulting from the vigorous influent and effluent action; the expansion and contraction of the volume of air within the inner end of the Bourdon tube 70. Though the theoretical basis of song motion is not fully understood, it is believed that it involves a vibration of the fluid in the Bourdon tube 70 at a particular frequency which creates a certain bubble effect. This bubble effect in turn assists in a significant way in dislodging the liquid and solid contaminants adhering to the inner surfaces of the tube 70 and in dispersing them in molecular amounts in the solvent to be easily withdrawn during the vacuum-withdrawal phase of the cycle.

The cleaning cycle or partial volume change of solvent is repeated automatically by the timer controlled solenoid valves 30 and 32 as many times as is necessary to clean the particular component. Five to ten minutes or about thirty to sixty partial volume changes are usually sufficient to clean most closed-end sensitive components to the desired cleanliness level.

At the completion of the preset cleaning time, a buzzer or other warning device (not shown) may be utilized to indicate that the effluent solvent sample is ready to be taken for the determination of the contamination level of the Bourdon gage 12.

SAMPLING

For the sampling operation, the cleaning solenoid switch 76 is turned to the "off" position when a light 108, which may be located on the panel 14 below the timer 33 in FIG. 1, is "on" at the completion of the cleaning cycle. This light indicates that the influent valve 30 is open. The circulation valve 42 is then turned to the "sample" position so as to provide fluid communication between the fluid line 90 from the effluent solenoid valve 32 and the sampling line 94. A filter paper may then be installed in the Millipore filter 52 to collect the contaminants dispersed in the effluent or vacuum-withdrawn Freon. The timer 33 is set to a predetermined sampling time, usually about five minutes and cleaning solenoid switch 76 may be turned on to activate the solenoid valves and the timer to carry out a number of partial volume changes of solvent with the effluent solvent being passed through the filter 52.

At the end of the preset sampling time as indicated by the warning device, the cleaning apparatus 10 may be turned off and the Millipore filter paper removed from the filter and sent to a laboratory for analysis. Assuming that the lab analysis indicates that the desired low contamination level has been reached, the Bourdon gage 12 may be removed from the cleaning port 24 and installed in the drying port 26 for the drying operation to insure that all vapors and traces of solvent are removed from the interior surfaces of the gage 12.

DRYING

To dry the Bourdon gage 12, the vacuum pump 46 is turned on and the vacuum in the line 102 and in the waste tank 44 is allowed to build up to approximately 16 inches Hg according to the drying vacuum gage 68. Of course, the vacuum bleed valve 66 may be cracked open if necessary to adjust the vacuum to the desired level. The pressure pump 36 is switched on and the reducing regulator 60 adjusted to a pressure reading on gage 64 of approximately 25 p.s.i. The timer 33 may then be set for the appropriate drying time, which is usually about five minutes.

If the gas is to be heated as is preferred, a thermostat 110 may be set to control the heater 62. A switch 112 may be employed to activate the heater. The temperature range for heating the gas may be varied between 0 and 150 degrees Fahrenheit.

The timer 33 with its associated circuitry (not shown) may then be activated by manipulation of switch 78 whereby the drying influent and effluent solenoid valves 54 and 56, will be automatically controlled to produce a series of successive drying cycles wherein heated nitrogen gas is pressure-surged in and vacuum-withdrawn from the Bourdon gage 12.

Thus, after about one-half of a man hour of time, the gage 12 may be cleaned to the desired aerospace cleanliness level and thoroughly dried, when heretofore it might have taken approximately sixteen man hours.

No attempt has been made to describe in detail the electronics and associate circuitry which controls the automatic, sequential, opening and closing action of the influent and effluent solenoid valves for both cleaning and drying operations, since the details thereof form no part of this invention. However, any of the number of suitable circuits may be utilized for this purpose as is well known by those skilled in the art. All fluid line hardware is preferably fabricated of stainless steel for cleanliness and strength.

Although the specific apparatus disclosed in FIGS. 1 and 2 includes a separate gage cleaning port 24 and a separate gage drying port 26, it is contemplated that both ports may be combined into a single port for the cleaning and drying operations if this were desired.

Additionally, the sampling operation may be carried out automatically if desired, by causing the effluent cleaning solvent to be periodically cycled through a filtering medium or other sampling element until the desired contamination level is reached. At this point, as determined by a suitable contamination level sensing circuit associated with the sampling element, the drying operation could be automatically carried out.

By the present method and apparatus for cleaning closed-end components such as Bourdon gages, any aerospace system level of cleanliness can be achieved in a relatively short period of time without damage or loss of calibration of the component. Furthermore, since the component is installed in a closed system during the cleaning, sampling and drying operations, entry of extraneous contaminants will be precluded.

It is to be understood of course, that the pressure and vacuum levels mentioned above may be altered to suit the particular type of sensitive component being cleaned so as to insure that no damage or loss of calibration will be encountered by the vigorous cleaning action of the solvent.

Although the foregoing disclosure relates only to a preferred embodiment of the invention, it should be understood that numerous modifications, changes or alterations may be made thereto without departing from the spirit and the scope of the invention as set forth in the appended claims.

Having thus described the invention, what is claimed is:

1. Apparatus for cleaning a component having an inwardly extending passage open at its outer end and closed at its inner end, said apparatus comprising:

a support including a stationary tube having a central axis, means for mounting said component on said support and coupling said passage to said tube with said passage inclined relative to said tube axis by a small acute angle, means for injecting a quantity of cleaning fluid under pressure from said tube into said passage through said outer end, means for withdrawing the cleaning fluid from said passage, and means for controlling said injecting means and said withdrawing means to operate alternatively during predetermined time intervals and in rapid succession, whereby turbulence of said cleaning fluid is produced in said passage thereby providing a vigorous cleaning action which dislodges and removes contaminants from within said passage.

2. The cleaning apparatus as set forth in claim 1, further comprising:

first tank means for supplying clean cleaning fluid to said passage under pressure, second tank means adapted to be placed under vacuum for receiving waste cleaning fluid from said passage, said injecting means including influent valve means for selectively placing said passage in fluid communication with said first tank means, said withdrawing means including effluent valve means for selectively placing said passage in fluid communication with said second tank means, and said controlling means including timer means to cause said influent and effluent valves to open and close alternatively during predetermined time intervals.

3. The cleaning apparatus according to claim 2, wherein:

said effluent valve is controlled by said controlling means to close sharply after only a portion of the cleaning fluid injected into said passage has been withdrawn, whereby a volume of cleaning fluid and air is left within the inner closed end of said passage which assists in removing the contaminants from said passage.

4. The apparatus according to claim 3, further comprising:

means upstream of said second tank means for sampling the waste cleaning fluid being withdrawn from said passage to ascertain the contamination level thereof, and circulation valve means for selectively placing said effluent valve in communication with said sampling means.

5. The cleaning apparatus as set forth in claim 4, further comprising:

means for injecting a quantity of clean dry gas into said passage, means for withdrawing said gas from said passage, and means for controlling said gas injecting means and said gas withdrawing means to operate alternately and in rapid succession, whereby substantially all vapors and traces of residual cleaning fluid in said passage are removed therefrom thereby drying said passage.

6. The cleaning apparatus according to claim 5, wherein:

said gas injecting means includes a second influent solenoid valve, said gas withdrawing means includes a second effluent solenoid valve, and said electrical timer means is operatively connected to said second influent and effluent solenoid valves.

7. The apparatus according to claim 4, wherein:

said sampling means includes a removable filter element.

8. The cleaning apparatus according to claim 4, wherein:

said influent and effluent valve means comprise solenoid valves, and said controlling means comprises an electrical timer means operatively connected to said influent and effluent solenoid valves.

9. Apparatus for cleaning a component having an inwardly extending passage open at its outer end and closed at its inner end, said apparatus comprising:

means for mounting said component on a stationary support, means for injecting a quantity of a cleaning fluid under pressure into said passage through said outer end, means for withdrawing the cleaning fluid from said passage, tank means, said withdrawing means including means for conducting fluid from said component mounting means to said tank means, means for controlling said injecting means and said withdrawing means to operate alternatively during predetermined time intervals and in rapid succession, and means operatively connected to said conducting means at both the upstream and downstream sections thereof and providing a fluid path therebetween for sampling the cleaning fluid withdrawn from said passage to ascertain the contamination level thereof, said sampling means defining a cleaning fluid flow path parallel with at least a portion of said conducting means flow path.

10. The apparatus according to claim 9, wherein:
said sampling means includes a removable filter element.

11. Apparatus for cleaning a component to a low level of contamination, said component having an inwardly extending passage with a central axis and being open at its outer end and closed at its inner end, said apparatus comprising:
fluid flow conduit means having a central axis,
mounting means for mounting said component with the axis of said component passage inclined relative to said conduit axis by a small acute angle,
means for injecting cleaning solvent into said component passage under pressure and withdrawing said solvent out of said component passage alternately and in rapid succession, whereby
the inclination of said component passage and the rapidly alternating flow of said solvent in said passage produces a turbulent effect that enhances the dislodging and carrying away of contaminants from said passage.

12. The apparatus according to claim 11, wherein:
said conduit axis is substantially horizontal, and
said mounting means mounts said component with the axis of said passage inclined upwardly from the horizontal such that the closed end thereof is at a greater elevation than the open end.

13. The apparatus according to claim 12, wherein said means for injecting and withdrawing solvent comprises:
influent valve means for selectively placing said passage in fluid communication with a source of clean solvent under pressure,
effluent valve means for selectively placing said passage in fluid communication with a waste solvent receiving vessel under vacuum, and
timer means operatively connected to said influent and effluent valve means for alternately opening and closing said valve means in rapid succession.

14. The apparatus according to claim 13, wherein:
the angle of inclination of said passage from the horizontal is within the range of between about 2°–15°.

15. The apparatus according to claim 14, further comprising:
means for sampling said waste solvent being withdrawn from said passage upstream of said vessel, and
means for injecting and withdrawing a dry gas into and out of said passage alternately and in rapid succession thereby drying said passage.

16. A method of cleaning a compartment having an inwardly extending passage open at its outer end and closed at its inner end, said method comprising the steps of:
mounting said component with said passage inclined slightly upwardly from the horizontal such that said closed end is at a higher elevation than said open end,
at least partially evacuating said passage, injecting a quantity of a cleaning fluid into said passage with turbulence whereby contminants in said passage will be dispersed in said cleaning fluid, and
subsequently applying a vacuum to said passage for withdrawing said cleaning fluid and said contaminants dispersed therein from said passage,
said injecting and vacuum applying steps being carried out alternately and in rapid succession, whereby
the inclination of said component passage and the rapidly alternating flow of said cleaning fluid causes a turbulent effect to be produced in said passage to thereby clean said component to a low level of contamination.

17. The cleaning method according to claim 16, further comprising the steps of:
sampling the cleaning fluid being withdrawn from said passage for determining the level of contamination thereof, and
drying said passage when a desired level of contamination has been reached.

18. The cleaning method according to claim 17, wherein:
said passage is inclined upwardly from the horizontal in the range of between about 2°–15°.

19. A method of cleaning a sensitive closed-end component to a low level of contamination comprising the steps of:
evacuating said component to a first level of vacuum,
injecting a quantity of a cleaning fluid into said evacuated component, and subsequently
evacuating said component to withdraw the cleaning fluid from said component,
said injecting and subsequent evacuating steps being carried out alternately and in rapid succession,
said component being subsequently evacuated to a level of a vacuum less than said first level of vacuum whereby a portion of the cleaning fluid injected into said component and a volume of air remains therein, and
a vigorous turbulent motion of the fluid is produced in said component to dislodge and carry away substantially all contaminants present therein, whereby
said remaining cleaning fluid and air contracts and expands during said successive injecting and subsequent evacuating steps, respectively, to assist in removing contaminants from said component.

20. A method of cleaning as set forth in claim 19, further comprising the steps of:
sampling the cleaning fluid removed from said component after a predetermined number of injecting and susequent evacuating steps have been performed to ascertain the cleanliness level of said component, and
drying said component with a dry gas after said predetermined level of contamination has been achieved.

21. A method of cleaning as set forth in claim 20, wherein said drying step includes:
evacuating said component,
injecting the gas into said evacuated component, and
evacuating said component to withdraw the gas and any residual cleaning fluid and vapor present therein,
said injecting and evacuating of the gas being carried out alternately and in rapid succession, whereby said component is thoroughly dried.

22. A method of cleaning as set forth in claim 21, further comprising the step of:
heating the gas within the range of about 0°–150° F. prior to being injected into said component.

23. A method of cleaning as set forth in claim 21, wherein:
said first level of vacuum equals about 16 inches Hg, and said cleaning fluid is injected into said passage at a pressure of approximately 25 p.s.i.

References Cited

UNITED STATES PATENTS

| | | | |
|---|---|---|---|
| 2,222,516 | 11/1940 | Powell et al. | 134—22 XR |
| 2,348,465 | 5/1944 | Geiringer | 134—22 XR |
| 2,493,120 | 1/1950 | Eaton | 134—21 |
| 2,912,990 | 11/1959 | Wilson | 134—169 |
| 2,941,908 | 6/1960 | Logan | 134—1 |
| 3,364,067 | 1/1968 | Piscitello et al. | 134—22 |

MORRIS O. WOLK, Primary Examiner

B. S. RICHMAN, Assistant Examiner

U.S. Cl. X.R.

15—302, 304; 134—21, 22, 89, 169